(12) United States Patent
Nordgaard et al.

(10) Patent No.: US 6,628,626 B1
(45) Date of Patent: Sep. 30, 2003

(54) WIRELESS DATA COMMUNICATIONS USING ASYMMETRIC CHANNEL ALLOCATION

(75) Inventors: Joseph K. Nordgaard, Fair Haven, NJ (US); Maria E. Palamara, Denville, NJ (US); Max Aaron Solondz, Morris Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/347,165

(22) Filed: Jul. 2, 1999

(51) Int. Cl.[7] .................................................. H04B 7/00
(52) U.S. Cl. ...................................... 370/277; 370/329
(58) Field of Search ................................ 370/310, 329, 370/330, 335, 342–5, 431, 441, 468, 465, 276, 277–281, 311, 328, 339; 455/403, 434, 435, 455, 464, 68, 103–105

(56) References Cited

U.S. PATENT DOCUMENTS

| | | | | |
|---|---|---|---|---|
| 5,128,959 A | * | 7/1992 | Bruckert | 370/335 |
| 5,483,676 A | * | 1/1996 | Mahany et al. | 370/346 |
| 5,535,207 A | * | 7/1996 | Dupont | 340/7.34 |
| 5,742,592 A | * | 4/1998 | Scholefield et al. | 370/329 |
| 5,818,829 A | * | 10/1998 | Raith et al. | 370/347 |
| 6,081,536 A | * | 6/2000 | Gorsuch et al. | 370/335 |
| 6,236,656 B1 | * | 5/2001 | Westerberg et al. | 370/395.4 |
| 6,317,435 B1 | * | 11/2001 | Tiedemann et al. | 370/335 |

FOREIGN PATENT DOCUMENTS

| | | | | |
|---|---|---|---|---|
| EP | 0 700 225 | 3/1995 | | H04Q/7/24 |
| WO | WO 99/53644 | 10/1999 | | H04L/5/02 |

* cited by examiner

*Primary Examiner*—David Vincent
(74) *Attorney, Agent, or Firm*—Christopher N. Malvone; Stephen M. Gurey

(57) ABSTRACT

High speed data transfer from a base station to a mobile terminal is provided using an additional wide band communication channel that supplements the communications provided by the reverse (mobile to base station) and forward (base station to mobile) links used in cellular or PCS communications systems. In one embodiment, the standard forward and reverse links are used as control channels for data transfers over the additional or adjunct forward wide band channel. In another embodiment, the communications carried out over the narrow band forward link channel are sent over the adjunct wide band forward channel thereby eliminating the need for a narrow band forward link channel.

10 Claims, 6 Drawing Sheets

WIRELESS DATA COMMUNICATIONS USING ASYMMETRIC CHANNEL ALLOCATION

BACKGROUND OF THE INVENTION

1. Field of the Invention

The present invention relates to wireless communications; more specifically, wireless data communications.

2. Description of the Prior Art

Cellular and PCS (Personal Communication Service) communications are typically based on a frequency division duplex (FDD) system. In this type system, one range of frequencies is used for communications from a base station to a mobile terminal (forward link), and another range of frequencies is used for communications from the mobile terminal to the base station (reverse link). FIG. 1 illustrates a conventional cellular FDD channel plan. Reverse link band 10 and forward link band 12 are divided into subbands labeled A and B. Typically, a different service provider provides service in each of the lettered bands. In the case of cellular communications in the United States, the reverse link band ranges from 824 MHz to 849 MHz, and the forward link band ranges from 869 MHz to 894 MHz. Each of the subbands are broken up into narrow band channels of 30 KHz in analog, TDMA, and CDPD systems, 1.22 MHz in CDMA systems, and 200 KHz in GSM systems. The narrow band channels are paired so that for a particular communication session between a mobile terminal and a base station, a narrow band reverse channel and narrow band forward channel are available. When data communications are implemented over cellular communication links, such as narrow band 30 KHz links relatively slow data transfer rates of 4.8 to 13.3 Kbits/sec are achieved.

FIG. 2 illustrates the United States PCS spectrum. As with the cellular, there is a reverse link band 50 and a forward link band 60. Each of the reverse link and forward link bands are broken into subbands labeled A, B, C, D, E and F, where a different service provider is licensed for operations in each of the subbands. In the case of the reverse link band, the band ranges from 1850 MHz to 1910 MHz, and in the case of the forward link band, the range is from 1930 MHz to 1990 MHz. As with the cellular band, pairs of channels are used for communications between a base station and a mobile terminal. In this case, however, if a CDMA (Code Division Multiple Access) system is used, the channel pairs have 1.25 MHz bandwidths. It should be noted, it is also possible to use TDMA (Time Division Multiple Access) systems for these types of communications. Systems such as CDMA systems offer an advantage over typical cellular systems in that the communication band for both the forward and reverse links are 1.25 MHz wide which allows a faster data transfer. Unfortunately, even a 1.25 MHz wide channel does not provide sufficient bandwidth for the timely transfer for large amounts of data. For example, a 1.25 MHz channel provides 9.6 to 13.3 Kbits/sec.

SUMMARY OF THE INVENTION

The present invention provides high speed data transfer from a base station to a mobile terminal using an additional wide band communication channel that supplements the communications provided by the reverse (mobile to base station) and forward (base station to mobile) links used in-cellular or PCS (Personal Communication Service) communications systems. In one embodiment, the standard forward and reverse links are used as control channels for data transfers over the additional or adjunct forward wide band channel as well as for voice and/or low speed data traffic. In another embodiment, the communications carried out over the narrow band forward link channel are sent over the adjunct wide band forward channel thereby eliminating the need for a narrow band forward link channel.

DETAILED DESCRIPTION

Figure 1:
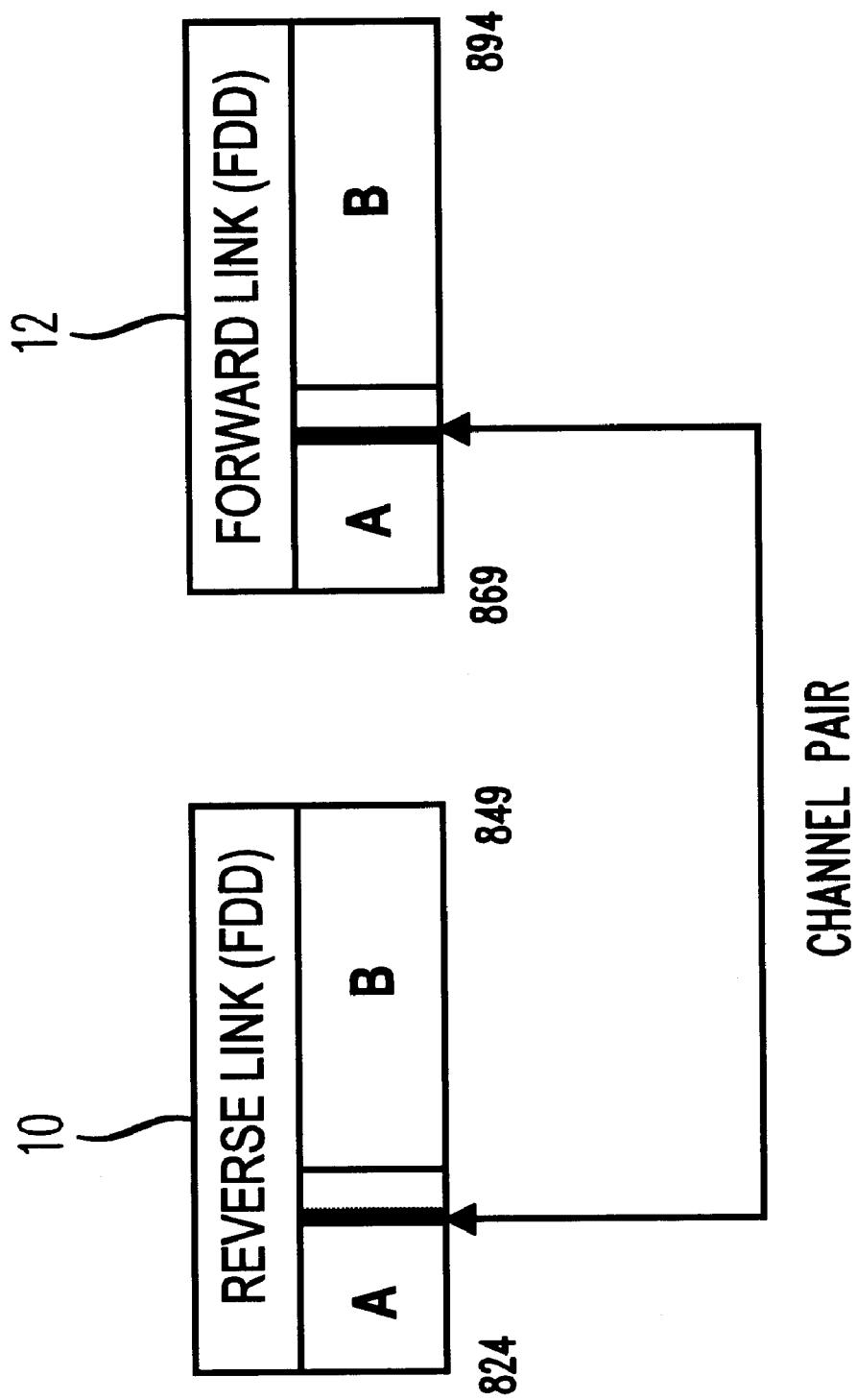
FIG. 1 illustrates a cellular forward and reverse link spectrum.
Figure 2:
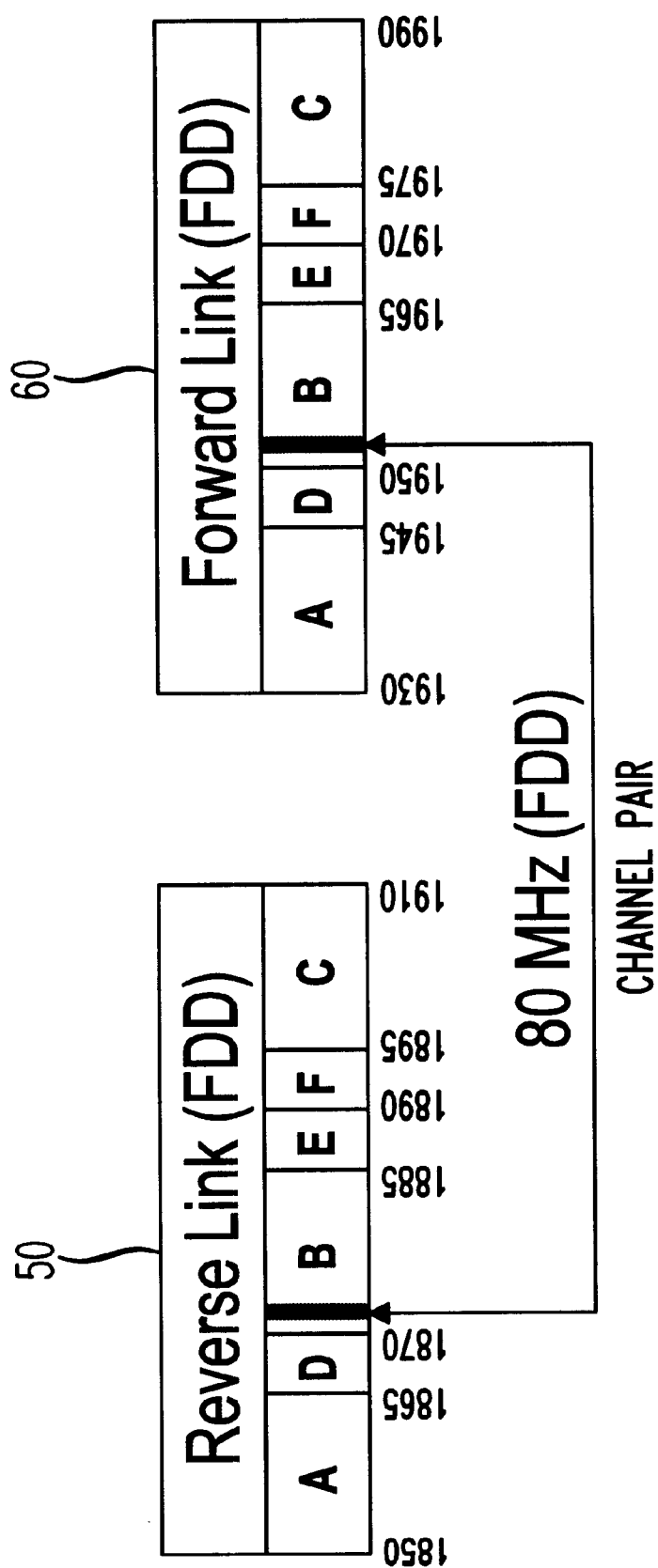
FIG. 2 illustrates a PCS forward and reverse link spectrum.
Figure 3:
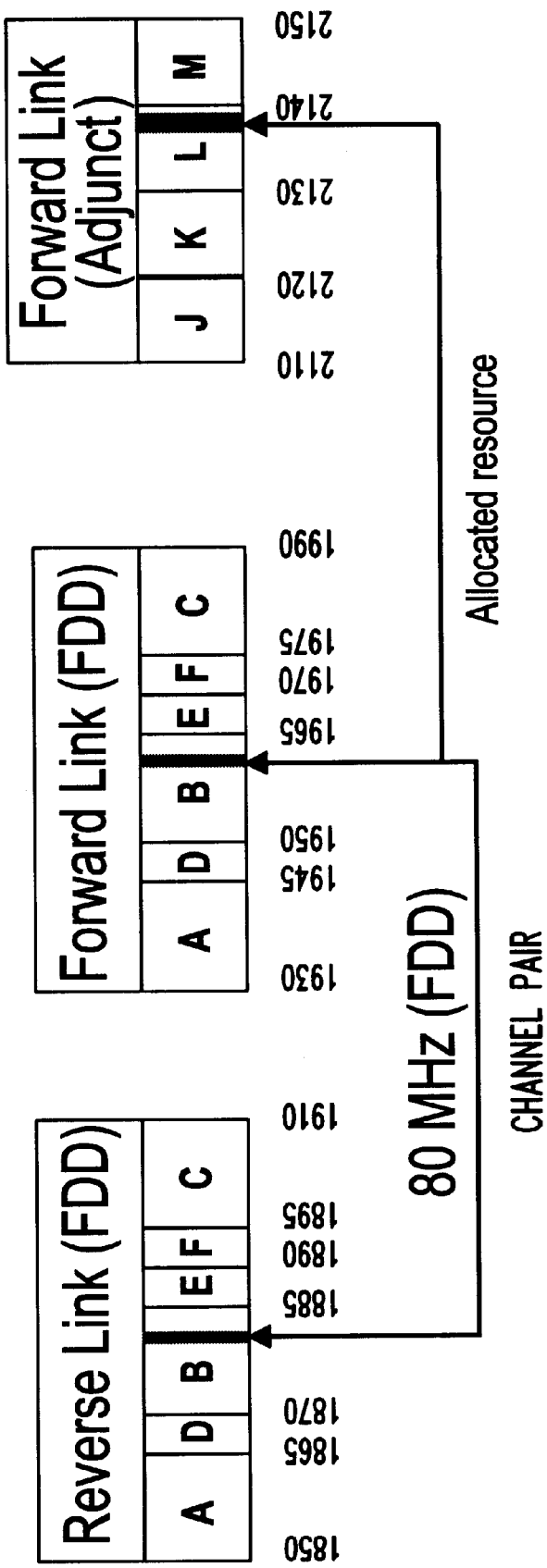
FIG. 3 illustrates a forward and reverse link spectrum with an adjunct spectrum.

FIG. 3 illustrates a reverse and forward link spectrum with an adjunct channel spectrum. The adjunct channel spectrum in the case of PCS may extend from 2110 MHz to 2150 MHz; however, other frequency ranges may be used. As with the other frequency ranges, the adjunct frequency range may be broken into subbands designated by letters where different service providers are licensed to operate within the different subbands.

The adjunct frequency spectrum is used for forward link data communications; however, it may also be used for reverse link data communications. It is preferable to use the adjunct spectrum for the forward link because, in most applications, mobile terminals are used to download large amounts of data while sending very little data towards the base station. A typical application is surfing the Internet. In the case where a service provider is licensed to operate in the D and L bands, a pair of relatively narrow channels in the B subband provides reverse and forward links that communicate control messages that support the high speed data transfer over a wider communication channel in the L subband. Standard data transfer protocols may be used to control the data transfer where these control signals are transferred over the narrower band channels in the B subband. The control signals, or messages, may include requests for a wide band data channel to begin a data transfer, acknowledgement of received data, or requests for retransmission of data. Since the data is typically transferred in a bursty fashion, it is not necessary to assign the wide band communication channel to a single mobile for long periods of time. As each mobile requests a data channel using the narrower band channels, the mobile is granted access to one or more wider band channels until a data transfer is complete. This results in a more efficient use of the spectrum while satisfying the user's need for bursty high speed data transfers.

It is also possible for separate service providers to control the narrow band channels and the wider band adjunct channel. In this situation, when the narrow band service provider receives a data transfer request, the narrow band service provider sends a request to the wide band adjunct channel service provider where that request is placed in a queue. When a channel becomes available the adjunct channel service provider reserves the wide band adjunct channel for use by the narrow band service provider. The narrow band service provider then initiates communications over the wide band adjunct channel.

Figure 4:
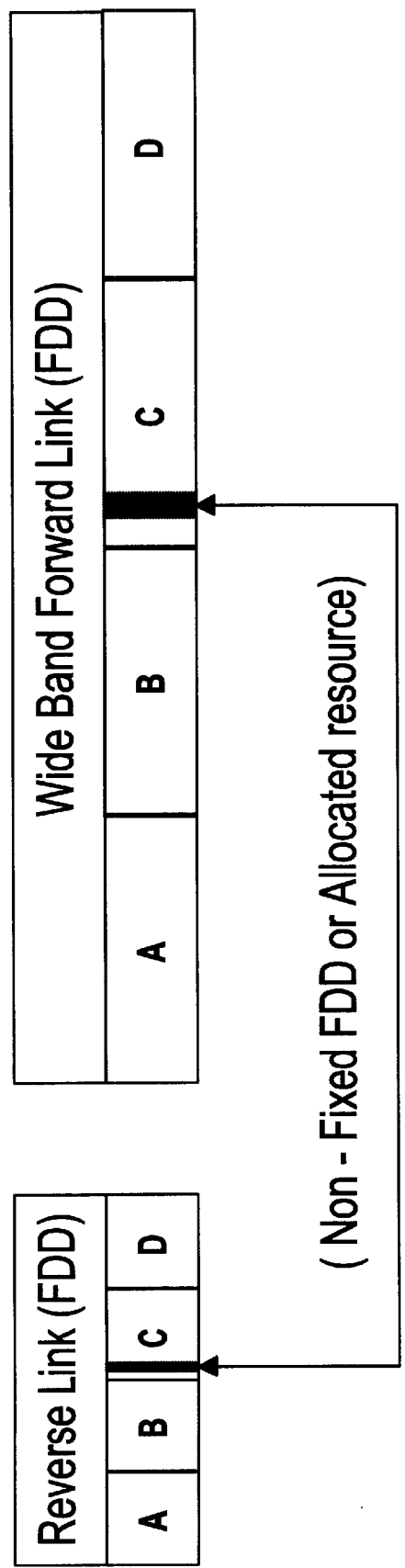
FIG. 4 illustrates a reverse link spectrum and a forward adjunct spectrum.

FIG. 4 illustrates an alternative where the information transferred over the narrower band forward link is transferred within the wider band adjunct forward link. In this case, control signals are passed over the narrow reverse link and over a portion of the wide band forward link, while the remainder of the wide band forward link is used for data transfer in the same fashion as the adjunct forward link in FIG. 3. Typically, a narrower portion of wide band link is used for control signals, and a wider portion of the wide band link is used for data transfer. It is also possible to multiplex the control signals and/or voice signals with the data signals on the wide band link. In the case illustrated in FIG. 4, the reverse link may be a single 1.25 MHz CDMA channel while the wide band forward link may be a 3.75 MHz wide CDMA channel.

Figure 5:
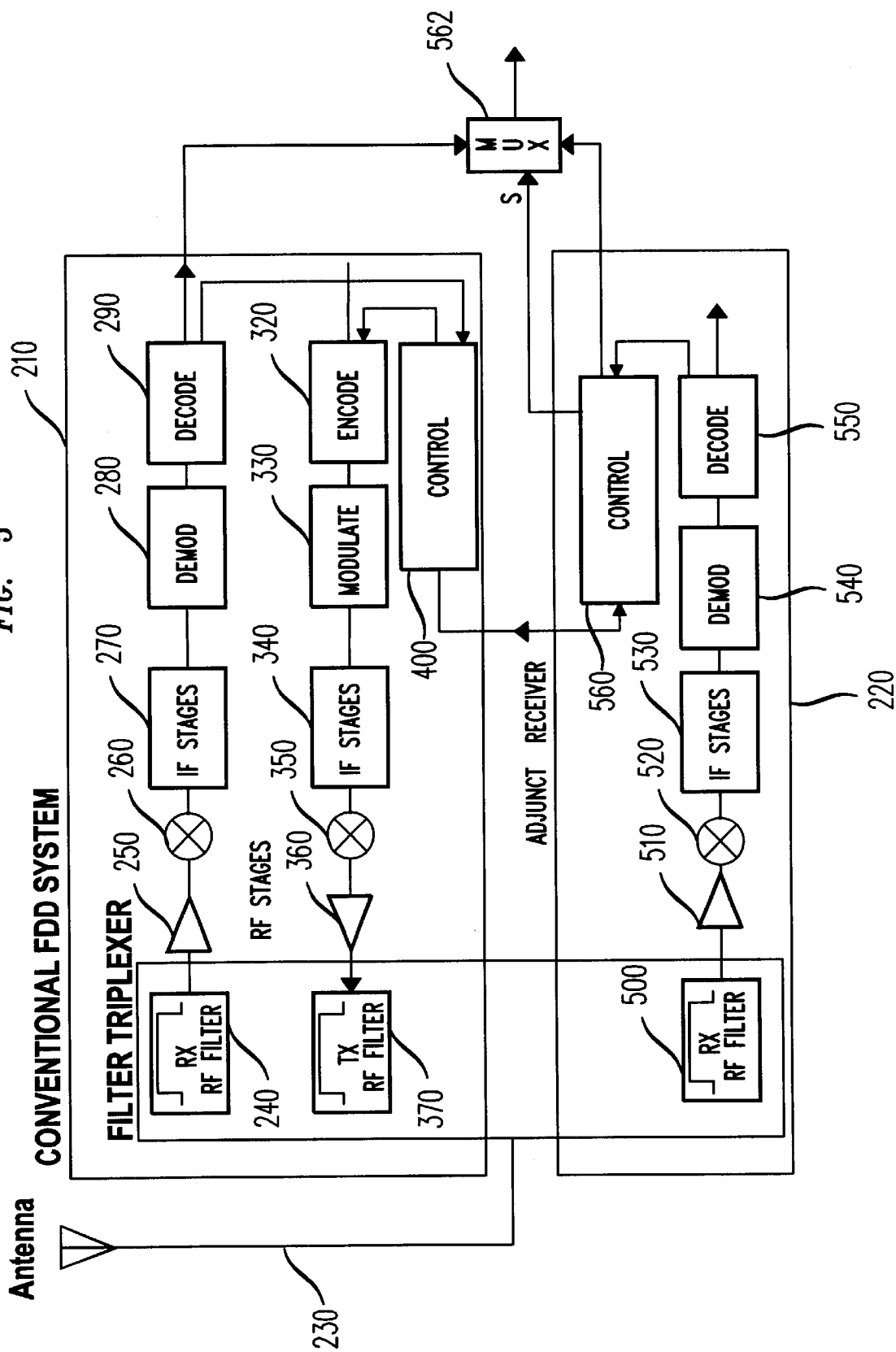
FIG. 5 is a block diagram of a mobile terminal that receives information over a forward adjunct channel.

FIG. 5 illustrates a mobile terminal that communicates over the narrow band forward and reverse links and receives data over the wider band adjunct forward link. Mobile terminal 200 includes conventional FDD (Frequency Division Duplex) section 210 and adjunct section 220. The mobile terminal receives and transmits information using antenna 230. The receiver portion of the conventional section includes receive filter 240, amplifier 250, mixer 260, IF stages 270, demodulator 280 and decoder 290. These components are typical of present-day cellular or PCS communication devices. The transmit portion of conventional portion 210 includes RF encoder 320, modulator 330, IF stages 340, mixer 350, power amplifier 360, and transmit RF filter 370. These components are also the typical components found in present-day cellular or PCS communication devices. Control processor 400 is used to receive and send control signals over the conventional receive and transmit paths for purposes such as obtaining access to a wireless network, providing voice communications, detecting voice channel errors, controlling power and operating the user interface.

Adjunct receiver 220 receives the data communicated over the wider band adjunct channel. The adjunct receiver also receives communications through antenna 230 and then filters the signal through the receive RF filter 500. The signal from RF filter 500 is amplified using amplifier 510, shifted down in frequency by mixer 520, amplified by IF stages 530 and demodulated by demodulator 540. The data is then decoded using decoder 550 which provides the data to the user. It should be noted that an antenna other than antenna 230 may be used to provide RF filter 500 with a signal when the frequency used for transmitting on the adjunct channel is not appropriate for antenna 230, or when a more directional antenna is desired. Control processor 560 monitors decoder 550 to detect errors. If an error is detected, control processor 560 instructs processor 400 to send a message such as a message which indicates that the data was received with errors and should be retransmitted. Control processor 560 may also instruct processor 400 to send messages indicating that data has been received successfully. Additionally, control processor 560 may instruct processor 400 to request access to a wide band communication channel when a data transfer is desired, or to release a wide band communication channel when a data transfer is complete. Control processor 560 may format the wide band data and it may control multiplexer 562 to multiplex the wide band data with voice or data from the narrow band channel.

Figure 6:
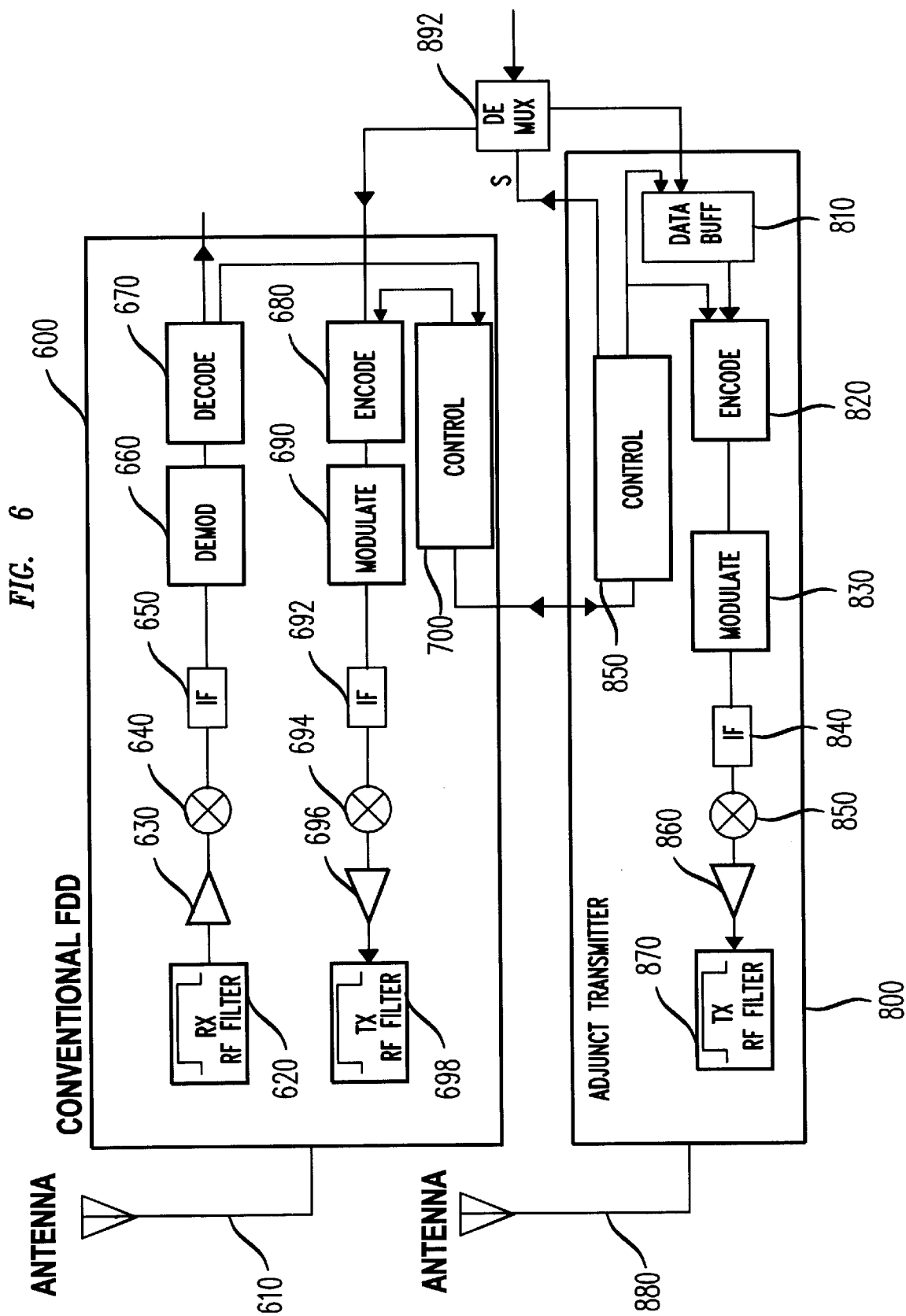
FIG. 6 is a block diagram of a base station that transmits information over the forward adjunct channel.

FIG. 6 illustrates a block diagram of a base station that supports data transmission over an adjunct wide band channel. The block diagram includes conventional FDD section 600. Antenna 610 supplies a signal to receive RF filters 620 which then supply a signal to amplifier 630. The output of amplifier 630 is provided to mixer 640 which provides a signal to IF stage 650. The output of IF stage 650 is passed through demodulator 660 and then through decoder 670. In the transmit portion of FDD section 600, encoder 680 provides a signal to modulator 690 which then provides a signal to IF stage 692. The output of IF stage 692 is provided to mixer 694 which provides a signal to power amplifier 696 which then passes the signal to transmit filters 698 and then out through antenna 610. Controller 700 provides overhead control for the narrow band channels by controlling items such as channel access and power control. Once again, the transmit and receive sections of the conventional FDD section provide communications over the uplink and narrow band channels which are used to control transmissions over the wider band adjunct channel and to provide voice communications.

Adjunct transmitter section 800 transmits data from the base station to the mobile terminal over the wide band data channel. Data buffer 810 receives data to be transmitted. The data buffer is used so that data can be collected until a broadband channel is made available for communications with a particular mobile, and it provides a buffer to hold data that should be retransmitted when data is received incorrectly at the mobile receiver. The output of data buffer 810 is provided to encoder 820 which provides a signal to modulator 830. The output from modulator 830 is provided to IF stage 840 which provides the signal to mixer 850. The output of mixer 850 is provided to power amplifier 860 which provides the signal through transmit filters 870 to transmit antenna 880. It should be noted that it is possible for a single antenna to be used for both the conventional FDD session and adjunct transmitter section, if the frequencies used for transmission in the conventional section and the adjunct section are close enough to be compatible with the same antenna. Control processor 890 receives signals such as control messages from the narrow band channels via control processor 700. Control messages include information such as a message indicating that the data has been received correctly, or that the data has been received incorrectly and should be retransmitted. Control processor 890 also controls the select input of demux 892 to steer wide band data to data buffer 810 and narrow band data or voice to encoder 680.

It should be noted that the broadband adjunct data channel may be reassigned frequently to different mobile receivers. This is due to the bursty nature of data which requires the broadband channel for relatively short periods of time. As a result, a single broadband channel can serve many mobile receivers. It should also be noted that by including an adjunct receiver in the base station and an adjunct transmitter in the mobile, high speed data transfers may be made from the mobile to the base station over the wide band adjunct channel. As a result, the wide band adjunct channel may be used as a forward or reverse link channel. When the wide band channel is used as a forward or reverse link, the channel may be sub-divided into forward and reverse links to support simultaneous, or nearly simultaneous, data transfer in the forward and reverse directions.

We claim:

1. A method for wireless data communications, comprising the steps of:

sending data communication control information over a first communication link in a first frequency band;

receiving data communication control information over a second communication link in a second frequency band; and sending data over a third communication link in a third frequency band using data communication control information transferred over at least one of the first and second communication links, where the first, second and third frequency bands are different, and the first and second frequency bands are narrower than the third frequency band.

2. The method of claim 1, wherein the first communication link and the third communication link are forward links between a base station and a mobile terminal, and the second communication link is a reverse link between a base station and a mobile terminal.

3. The method of claim 1, wherein the first communication link and the third communication link are reverse links between a base station and a mobile terminal, and the second communication link is a forward link between a base station and a mobile terminal.

4. A method for wireless data communications, comprising the steps of:

sending data communication control information over a first communication link in a first sub-band of a first frequency band;

receiving data communication control information over a second communication link in a second frequency band; and sending data over a third communication link in a second sub-band of the first frequency band using data communication control information transferred over at least one of the first and second communication links, where the first sub-band, the second sub-band and the second frequency band are different, and the first sub-band is narrower than the second sub-band.

5. The method of claim 4 wherein the third communication link is a forward link between a base station and a mobile terminal, and the second communication link is a reverse link between a base station and a mobile terminal.

6. The method of claim 4 wherein the third communication link is a reverse link between a base station and a mobile terminal, and the second communication link is a forward link between a base station and a mobile terminal.

7. A method for wireless data communications, comprising the steps of:

sending data communication control information over a first communication link in a first frequency band;

receiving data communication control information over a second communication link in a second frequency band; and sending and receiving data over a third communication link in a third frequency band using data communication control information transferred over at least one of the first and second communication links where the first, second and third frequency bands are different, and the first and second frequency bands are narrower than the third frequency band.

8. The method of claim 7, wherein data is sent and received substantially simultaneously.

9. A method for wireless data communications, comprising the steps of:

sending data communication control information over a first communication link in a first sub-band of a first frequency band;

receiving data communication control information over a second communication link in a second frequency band; and sending and receiving data over a third communication link in a second sub-band of the first frequency band using data communication control information transferred over at least one of the first and second communication links, where the first sub-band, the second sub-band, and the second frequency band are different, and the first sub-band is narrower than the second sub-band.

10. The method of claim 9, wherein data is sent and received substantially simultaneously.

* * * * *